(12) United States Patent
Theriot et al.

(10) Patent No.: US 9,085,039 B1
(45) Date of Patent: Jul. 21, 2015

(54) FIELD PORTABLE PIPE-MOUNTED PIPE CUTTING SYSTEM WITH INTEGRAL CONTROLS

(71) Applicant: Mathey Investments, Inc., Tulsa, OK (US)

(72) Inventors: Peter Theriot, Tulsa, OK (US); Robert Grantham, Stillwater, OK (US); Josh Wilson, Sperry, OK (US); Stephen Seymour, Edmond, OK (US)

(73) Assignee: Mathey Investments, Inc., Tulsa, OK (US)

( * ) Notice: Subject to any disclaimer, the term of this patent is extended or adjusted under 35 U.S.C. 154(b) by 122 days.

(21) Appl. No.: 13/955,921

(22) Filed: Jul. 31, 2013

(51) Int. Cl.
*B23K 37/02* (2006.01)
*B23K 7/00* (2006.01)

(52) U.S. Cl.
CPC ..................... *B23K 7/006* (2013.01)

(58) Field of Classification Search
CPC ......... B23K 7/006; B23K 7/007; B23K 7/102
USPC .................................................... 266/54, 67
See application file for complete search history.

(56) References Cited

U.S. PATENT DOCUMENTS

| 2,408,517 | A | | 10/1946 | Howard |
| 4,440,383 | A | * | 4/1984 | Dearman ..................... 266/54 |
| 6,696,012 | B1 | | 2/2004 | Theriot |
| 2006/0027952 | A1 | * | 2/2006 | Meissner et al. ............... 266/67 |
| 2009/0005907 | A1 | | 1/2009 | Kronenberg |
| 2010/0147094 | A1 | | 6/2010 | Kronenberg |

* cited by examiner

*Primary Examiner* — Scott Kastler
(74) *Attorney, Agent, or Firm* — Head, Johnson & Kachigian, P.C.

(57) ABSTRACT

A field portable pipe-mounted pipe cutting system with integral controls. The system includes a torch carriage assembly having a torch for cutting a cylindrical pipe. A saddle and cap ring assembly is secured to the pipe. A ring gear engages the saddle and cap ring. At least one drive gear engages the ring gear. A drive gear step motor rotates the drive gear. A motion control module controls movement of the step drive motor. The lead screw assembly moves the torch carriage assembly longitudinally parallel to an axis of the pipe. A lead screw step drive motor drives the lead screw assembly and a motion control module controls movement of the lead screw step drive motor.

8 Claims, 14 Drawing Sheets

FIELD PORTABLE PIPE-MOUNTED PIPE CUTTING SYSTEM WITH INTEGRAL CONTROLS

BACKGROUND OF THE INVENTION

1. Field of the Invention

The present invention relates to a field portable pipe-mounted pipe cutting system with integral controls. In particular, the present invention is directed to a pipe cutting system which will select from and perform a wide variety of cuts on a cylindrical pipe.

2. Related Art

Sections of metal pipe are utilized in a various applications. Pipe sections are joined together end to end for transportation of liquid or gas or for creating structures. Additionally, pipe cuts are made in the walls of pipes for various connections including perpendicular and angled connection of pipes, and connection of a wide variety of equipment, such as valves, monitors, sensors and other equipment.

Pipe cutting is often accomplished through various means, either by machining or by flame, plasma arc, laser or water jet.

The standard known procedure for pipe end-shape or hole cutting involves a, manual process where, for example, a hole to be placed in the pipeline is laid out by hand with a paper or other template. The pipe would then be cut based on the marking on the pipe.

Howard (U.S. Pat. No. 2,408,517) discloses a somewhat automated process where a, pip-cutting apparatus mounts on a, pipe with an arm for holding a cutting torch which is adapted to circumnavigate the pipe. No other types of cuts were possible.

Theriot (U.S. Pat. No. 6,696,014 Assignee's prior patent, discloses a torch arm carriage assembly to circumnavigate the pipe.

In addition, there are also known stationary pipe cutting devices which rotate the pipe itself with the machine remaining stationary. These may utilize a computer with CNC software. While these devices are capable of computer directed pipe cuts, they are relegated to industrial plants and are not useful for making cuts in the field.

There remains a need for a field portable pipe mounted pipe-cutting system with integral controls.

There also remains a need for a field portable pipe mounted pipe-cutting system which will interface with various known computers, such as readily available lap top computers.

There remains a need for a field portable pipe mounted pipe-cutting system with integral controls which will include a computer driven process with a human interface to select the type of pipe cut desired.

SUMMARY OF THE INVENTION

The present invention is directed to afield portable pipe-mounted pipe cutting system with integral controls.

A torch carriage assembly supports a torch holder for receipt of a cutting torch. A saddle and cap ring, in the general shape of a horseshoe, has an opening slightly larger than the outside diameter of the pipe. Threaded spacer bolts are threadably received in threaded openings in ears extending from the saddle and cap ring.

A ring gear concentric with saddle and cap ring rotates about the saddle and cap ring on a bearing surface.

At least one drive gear engages the ring gear so that rotation of the drive gear translates to into movement of the ring gear. A drive gear step drive motor has a rotating shaft which rotates the drive gear. A motion control module controls movement of the drive gear step drive motor.

A lead screw assembly moves the torch carriage assembly and its accompanying torch holder and torch linearly or longitudinally in a direction parallel to an axis of the pipe. A lead, screw step drive motor rotates a lead screw which translates into movement of the torch carriage assembly.

A motion control module controls movement of the lead screw step drive motor.

Pipe cutting system also includes interface software drivers as well as a power supply within a, housing which is connected to the saddle and cap ring. The interface software drivers will communicate with software on an external central processing unit, such as a laptop computer.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
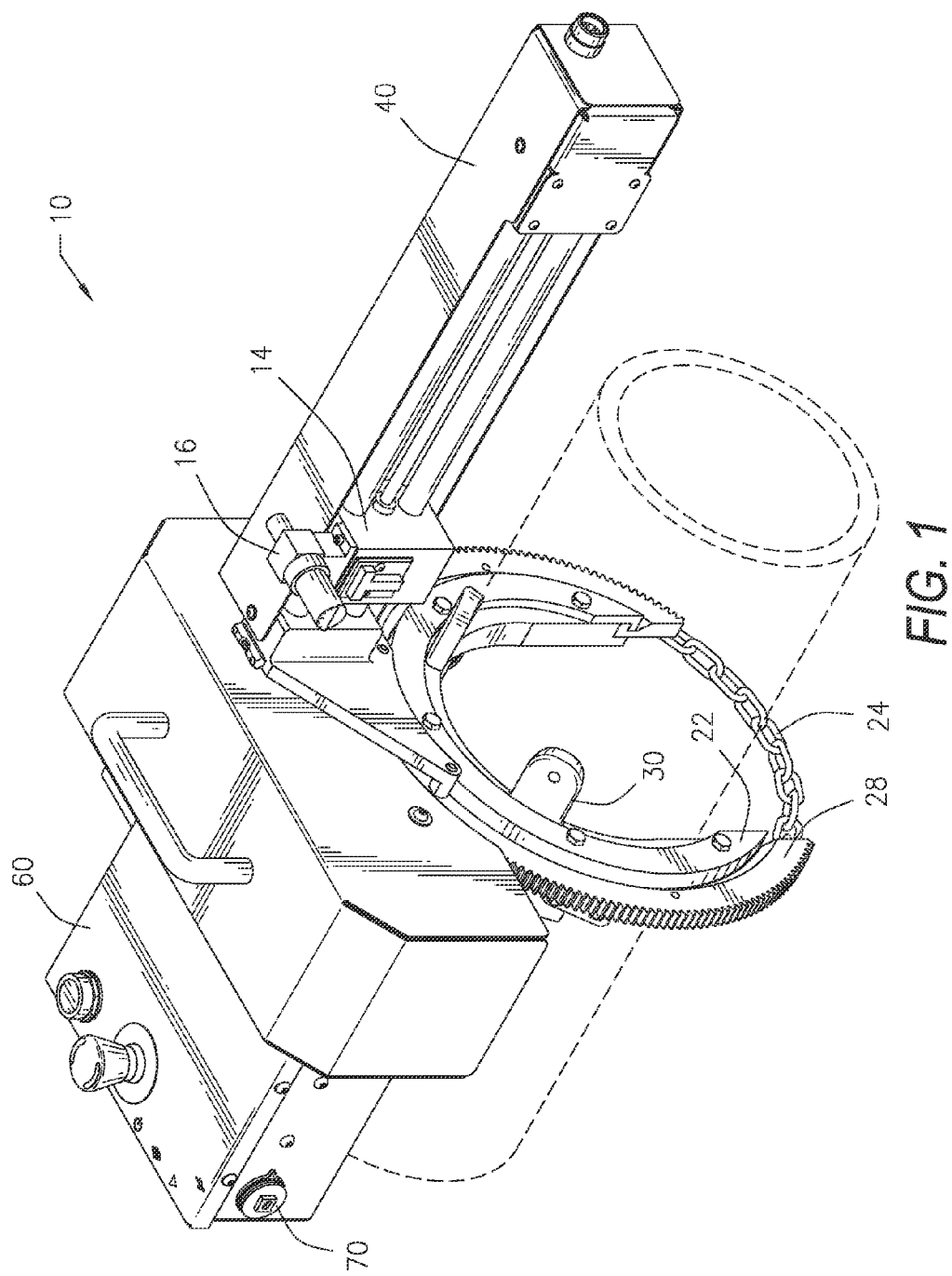
FIGS. 1 and 2 illustrate alternate perspective views of a field portable pipe-mounted pipe cutting system with integral controls as set forth in the present invent.
Figure 2:
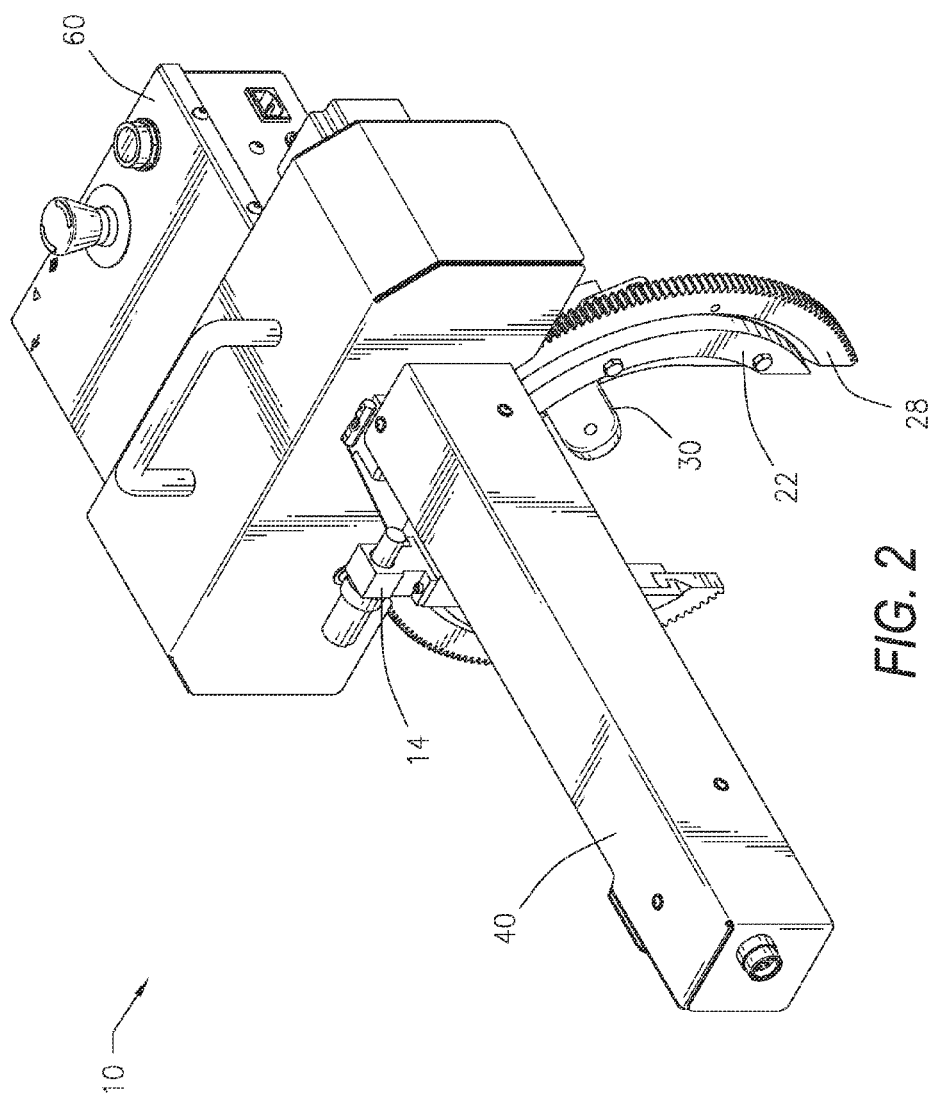
Figure 3:
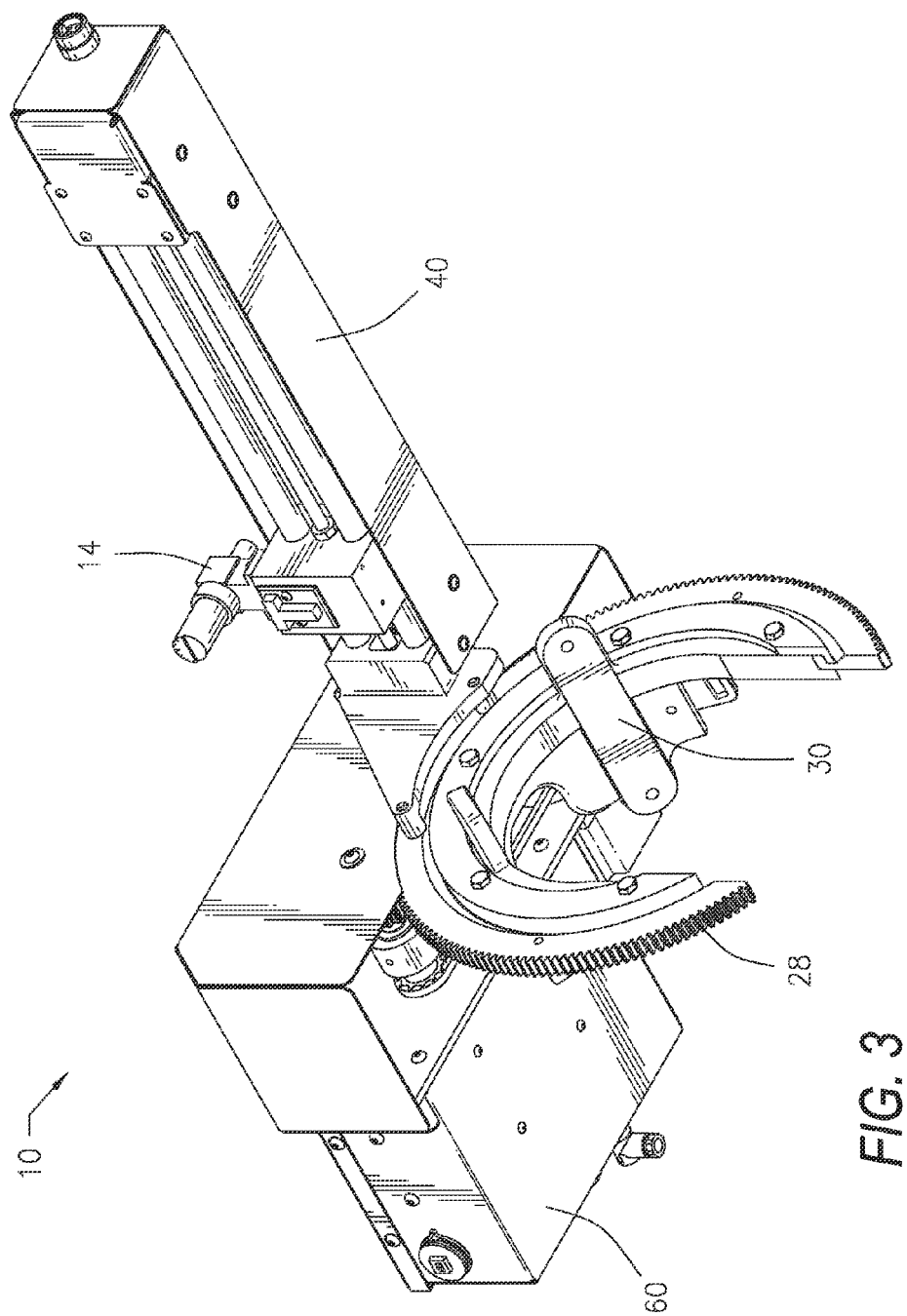
FIG. 3 illustrates a perspective view of the pipe cutting system shown in FIG. 1.
Figure 3A:
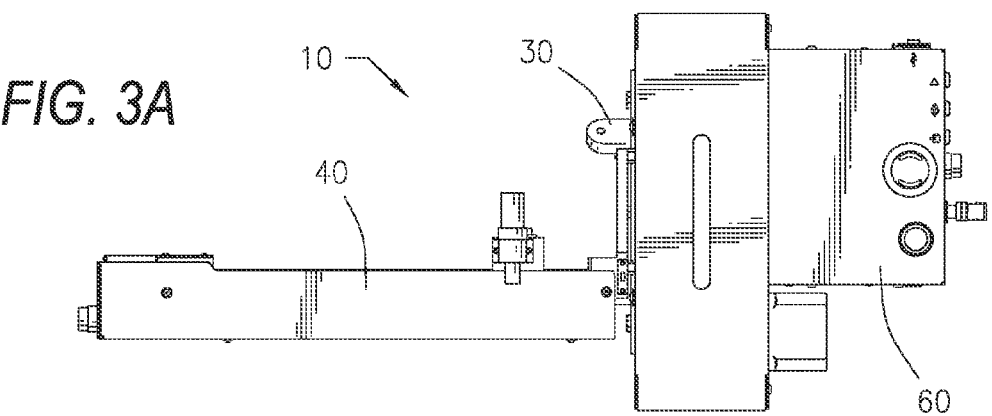
FIGS. 3A and 3B illustrate side views of the pipe cutting system shown in FIG. 1.
Figure 3B:
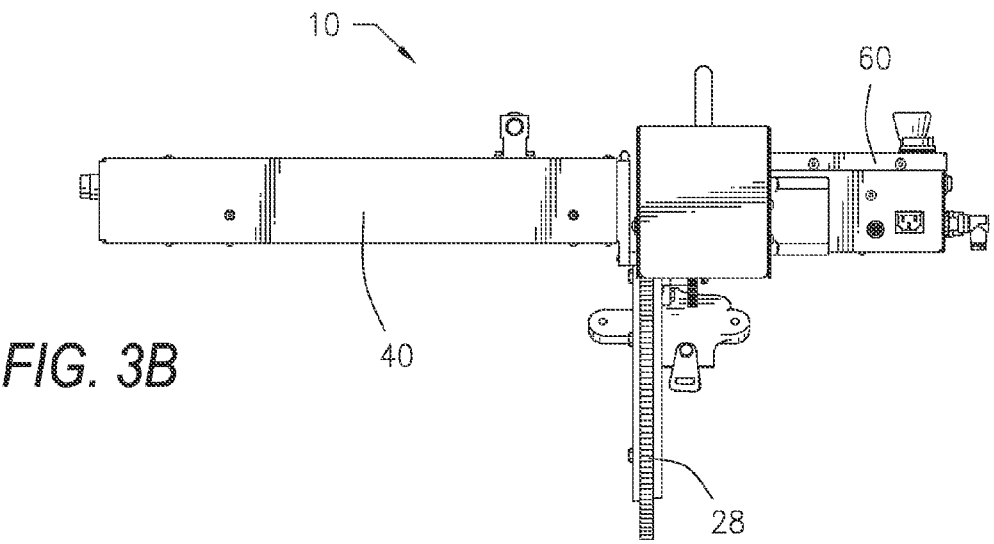
Figure 3C:
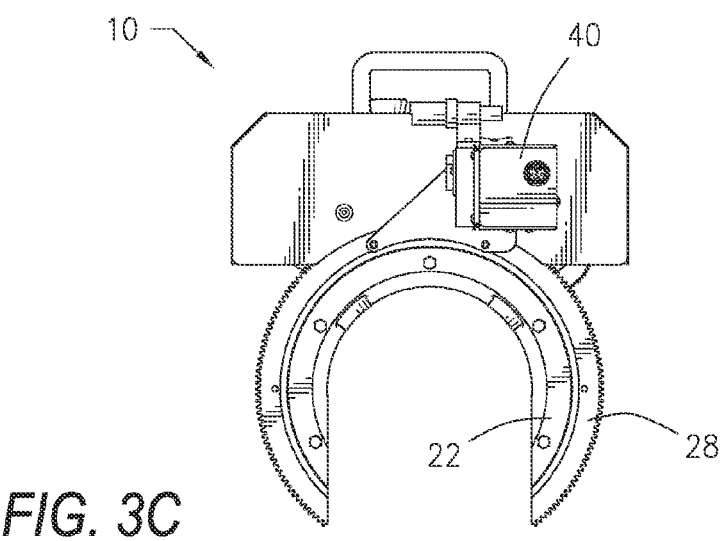
FIG. 3C illustrates an end view of the pipe cutting system shown in FIG. 1.
Figure 4:
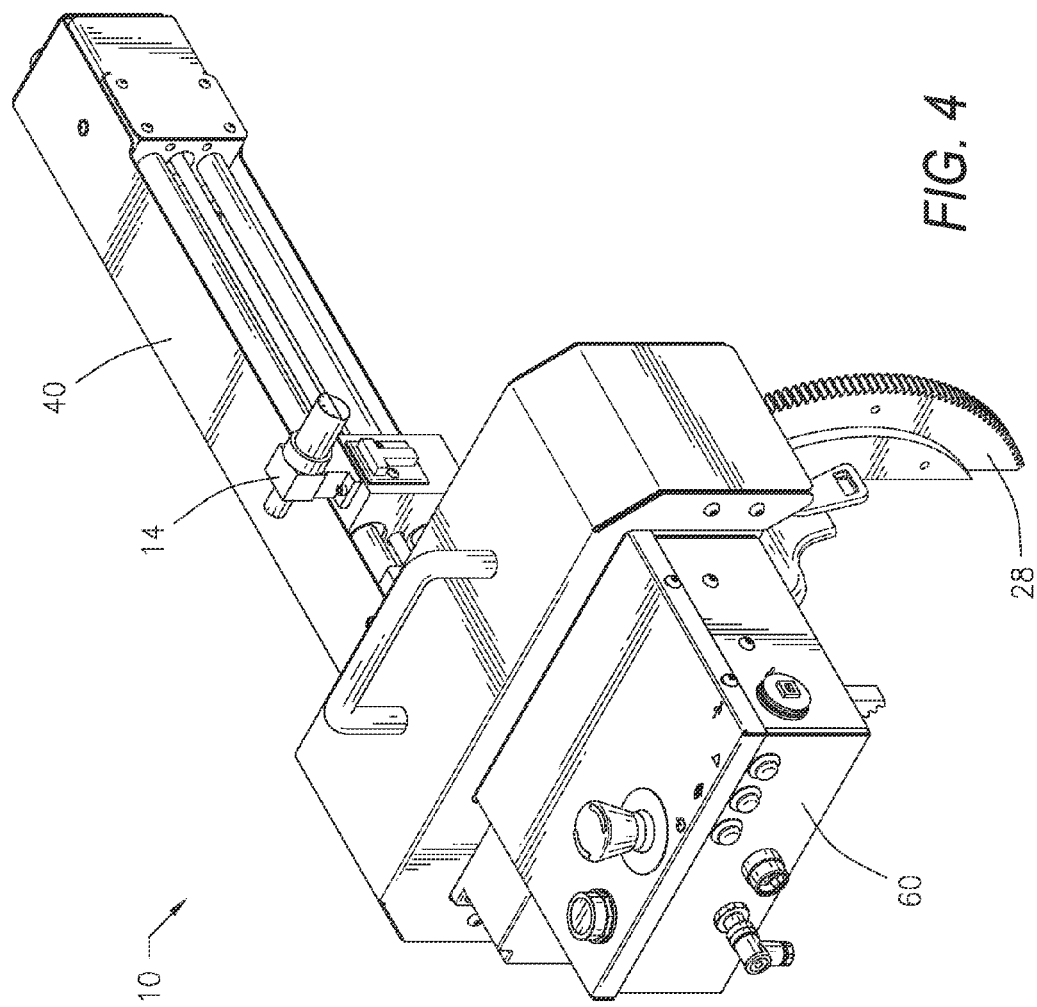
FIG. 4 illustrates a perspective view of the pipe cutting system shown in FIG. 1.
Figure 4A:
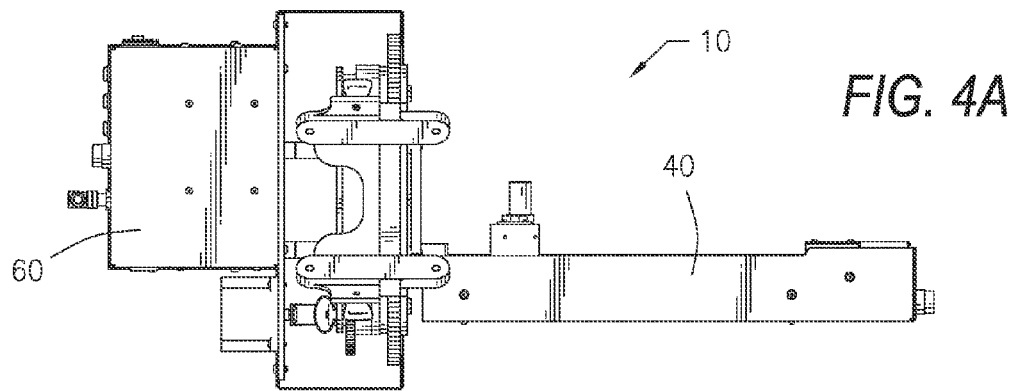
FIGS. 4A and 4B illustrate-side views of the pipe cutting system shown in FIG. 1.
Figure 4B:
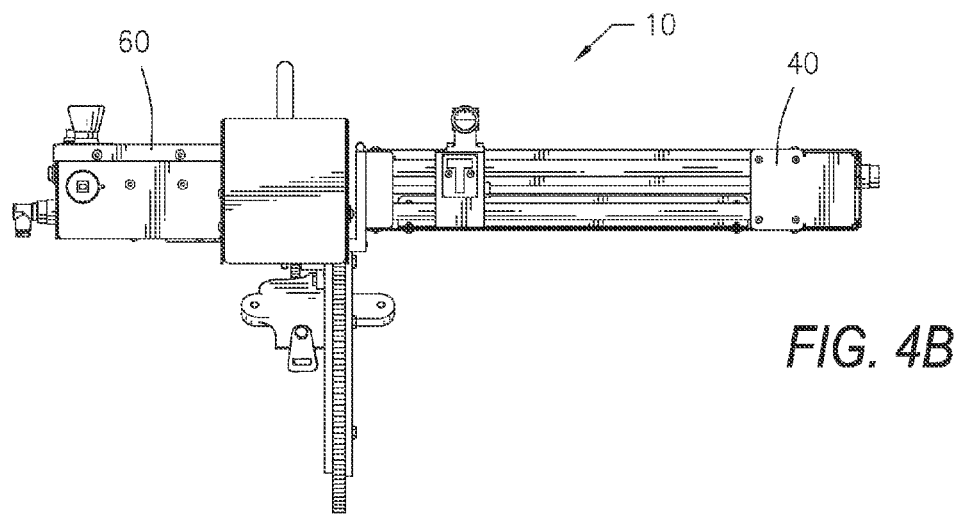
Figure 4C:
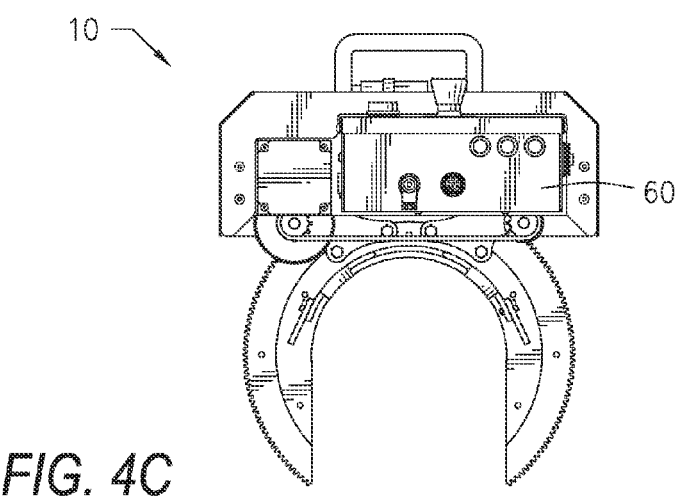
FIG. 4C illustrates an end view of the pipe cutting system shown in FIG. 1.
Figure 5:
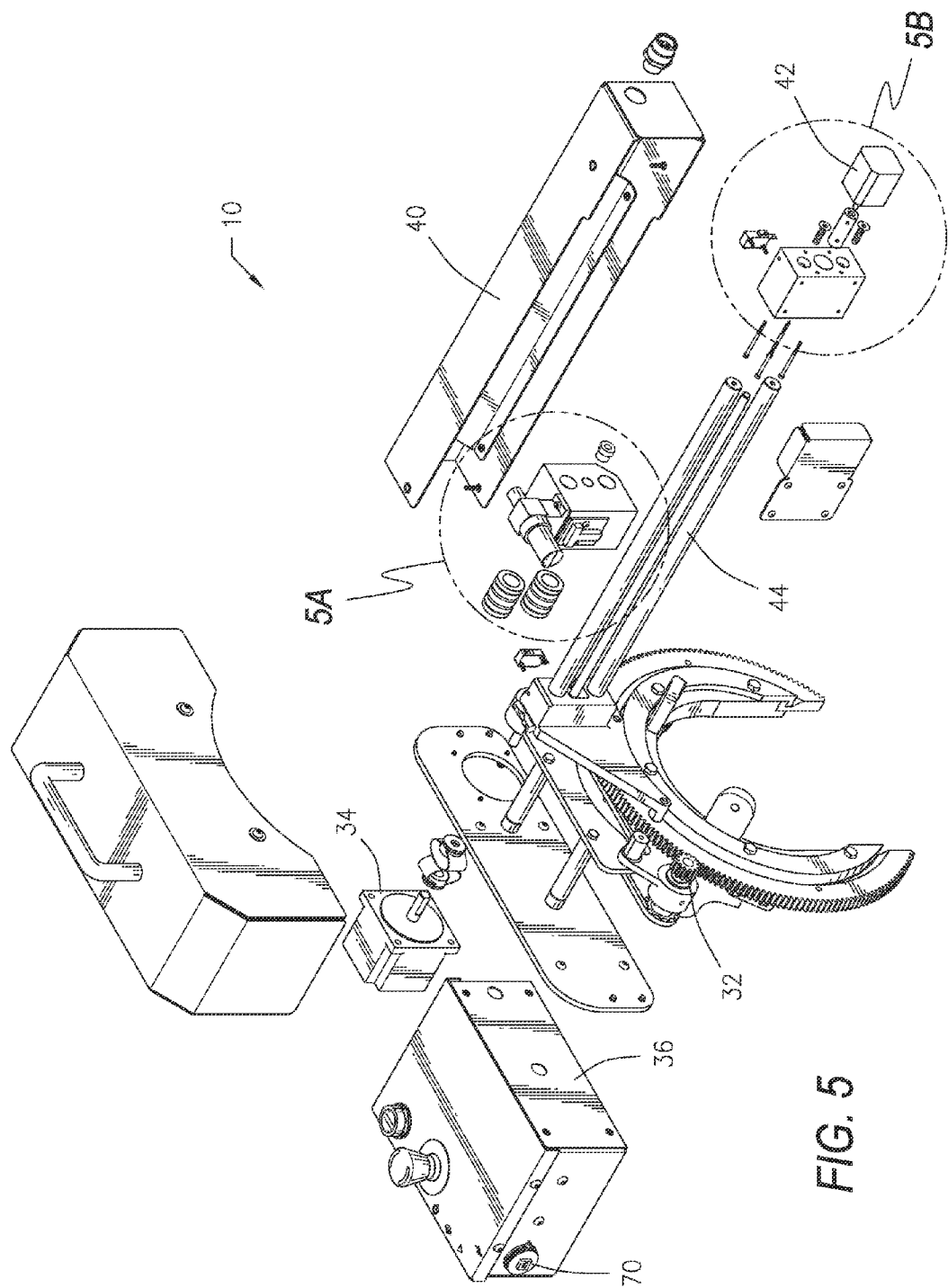
FIGS. 5, 5A and 5B illustrate exploded views of the pipe cutting system shown in to FIG. 1.
Figure 5B:
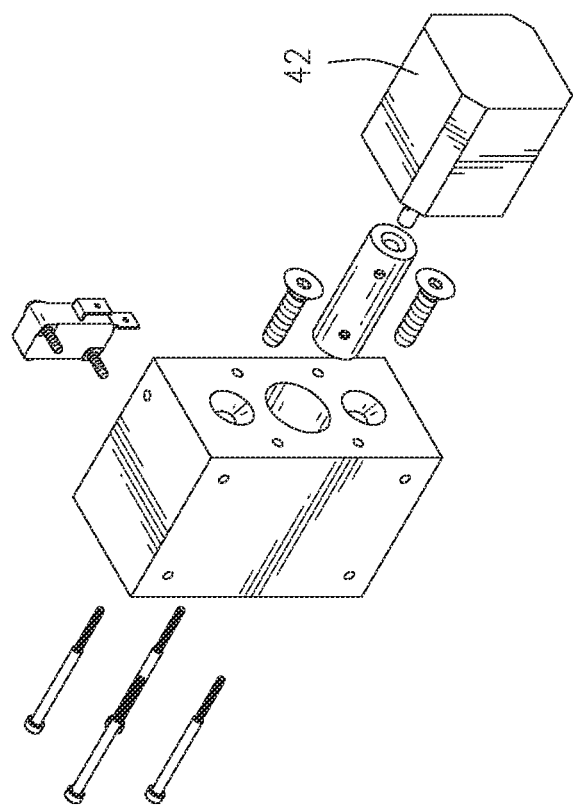
Figure 5A:
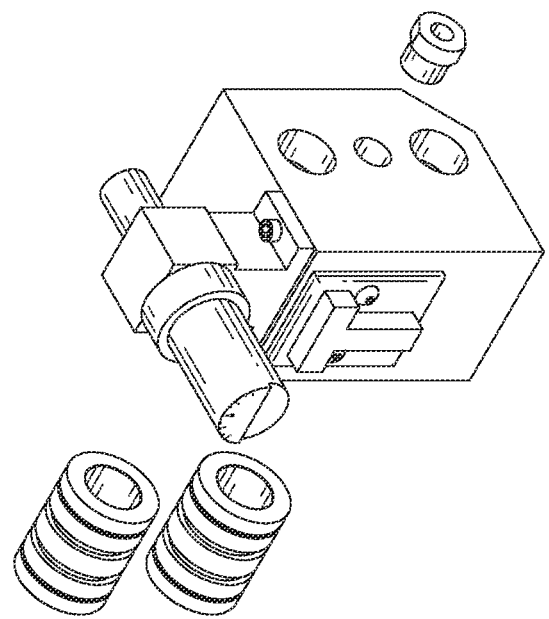

FIGS. 1 and 2 illustrate alternate perspective views of a field portable pipe-mounted pipe cutting system 10 with integral controls as set forth in the present invention. FIG. 3 illustrates a series of side and end views of the pipe cutting system 10 shown in FIG. 1. FIG. 4 illustrates a series of side and end views of the system 10 shown in FIG. 1. FIG. 5 illustrates an exploded view of the system 10 shown in FIG. 1.

A torch carriage assembly 14 supports a torch holder 16 for receipt of a, cutting torch 18. The torch holder 16 may retain an oxy-fuel cutting torch, a plasma arc torch, a laser cutting torch or other cutting mechanisms such as a water jet nozzle.

A saddle and cap ring 22 are in the general shape of a horseshoe which has an opening slightly larger than the outside diameter of a pipe 12 (shown in dashed lines) to be cut. The pipe cutting system 10 will be brought to a field work site with the saddle and cap ring 22 brought over the exterior of the pipe 12. Threaded spacer bolts are threadably received in threaded openings in ears 30 extending from the saddle and cap ring 22.

A boomer chain 24 assists in securing the cap ring to the pipe 12.

A ring gear 28 concentric with the saddle and cap ring 22 rotates around the saddle and cap ring 22 on a, bearing surface (not visible).

At least one drive gear 32 (visible in the exploded view in FIG. 5) engages the ring gear 28. In a preferred embodiment, two parallel drive gears 32 are employed, each of which engages the ring gear 28. The pair of drive gears 32 are connected by a chain. Accordingly, rotation of the drive gear or gears 32 translates into movement of the ring gear 28. As best seen in FIG. 5, a drive gear step drive motor 34 has a rotating shaft which rotates the drive gear or gears 32.

Also as seen FIG. 5, a motion control module 36 controls movement of the drive gear step drive motor 34.

A lead screw assembly 40 moves the torch carriage assembly 14 and its accompanying torch holder 16 and torch 18 linearly or longitudinally in a direction parallel to an axis of the pipe 12.

A lead screw step drive motor 42 (seen in the exploded view in FIG. 5) rotates a lead screw 44 which translates into movement of the torch carriage assembly 14. In a preferred embodiment, a pair of parallel guide rods 50 parallel to the lead screw 44 direct movement of the torch carriage assembly 14.

A motion control module 36 controls movement of the lead screw step drive motor 42.

The pipe cutting system 10 also includes interface software or drivers as well as a power supply within a housing 60 which is connected to the saddle and cap ring 20. As will be described herein, the interface software or drivers will communicate with software on an external central processing unit, such as a laptop computer.

Figure 6:
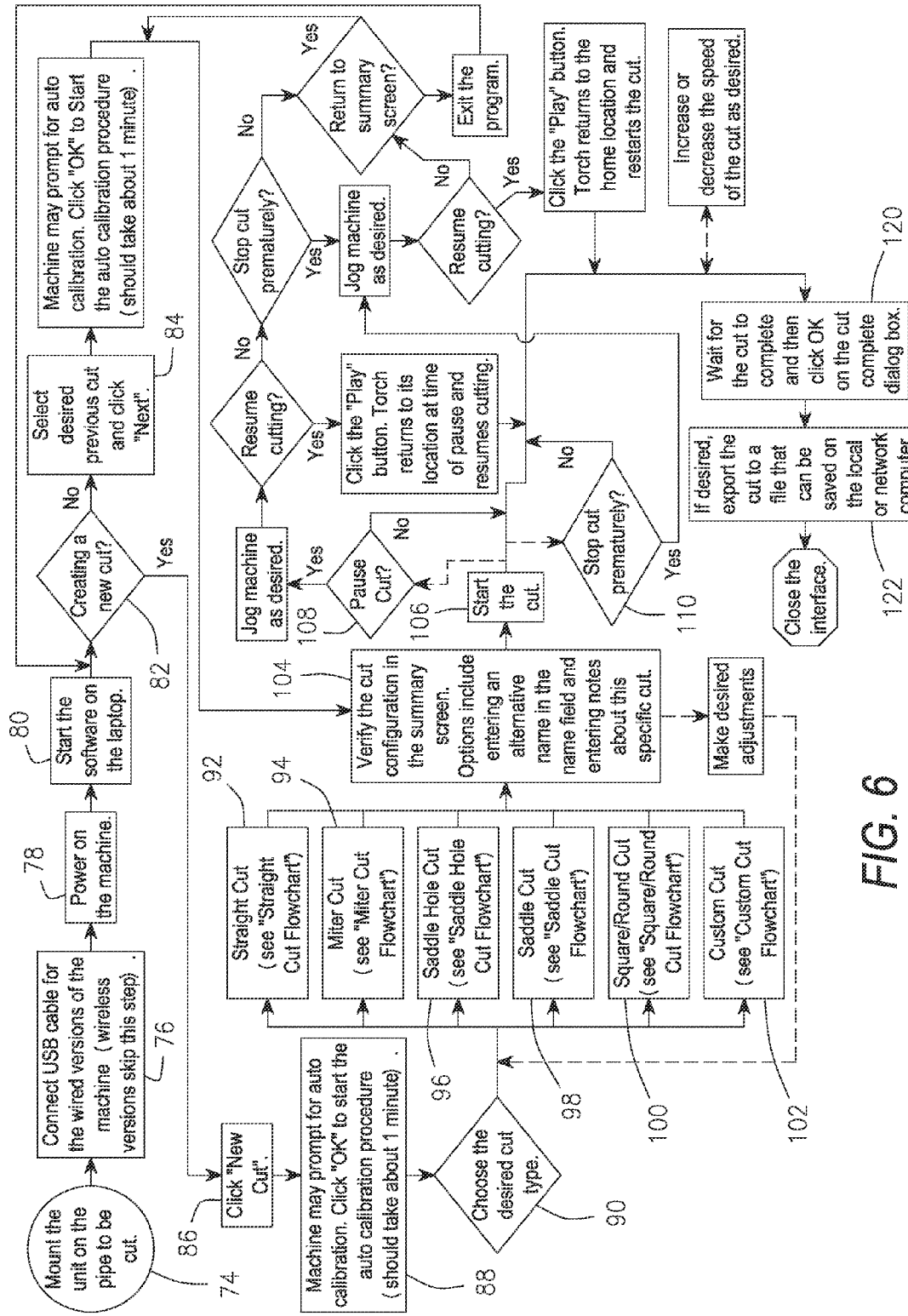
FIG. 6 illustrates a schematic flow chart of a pipe cutting process for a field portable pipe-mounted pipe cutting system as set forth in the present invention.

FIG. 6 illustrates a simplified schematic diagram of the pipe cutting process. In order to utilize the present invention, initially, the pipe cutting system 10 is lowered over a cylindrical metal pipe 12 so that the saddle and cap ring 22 resides over the outside of the pipe as shown in circle 74. The spacer bolts 20 are adjusted, if necessary, so that the pipe cutting system 10 is concentric over the pipe. The boomer chain 24 is then secured to hold the pipe cutting system 10 on the pipe 12.

The orientation of the torch 18 with respect to the torch carriage assembly 14 may be adjusted, if desired. The torch 18 will ordinarily be oriented perpendicular to the axis of the pipe 12.

The pipe cutting system 10 is then electronically connected to an external central processing unit, such as a lap top computer having software to control the motion control module 36, as shown at box 76. The electronic connection may be made in a number of ways, wireless connection may be made between the tap top computer and the interface software on the pipe cutting system 10. Alternatively, a cable, such as a USB cable with a USB plug, may be connected to a port 70 on the housing 60. Thereafter, power to the system 10 is initiated as shown at box 78.

As best seen at box 80, the software on the central processing unit is initialized and started. The user will be presented with a graphical user interface throughout the procedure. As seen at diamond 82, the user will be queried whether a new cut is to be created. As seen in box 84, if the answer is no, the user will select from, the previous cuts to select the desired pipe cut.

If a new pipe cut is desired, as shown at box 82, the selection "new cut" will be chosen as shown at box 86. An auto calibration procedure may be performed as shown at box 88.

Thereafter, as shown at box 90, a choice will be presented to the user for a desired type of pipe cut. As seen in boxes 92, 94, 96, 98, 100 and 102, the user will be presented with visual choices of different pipe cuts.

Figure 7:
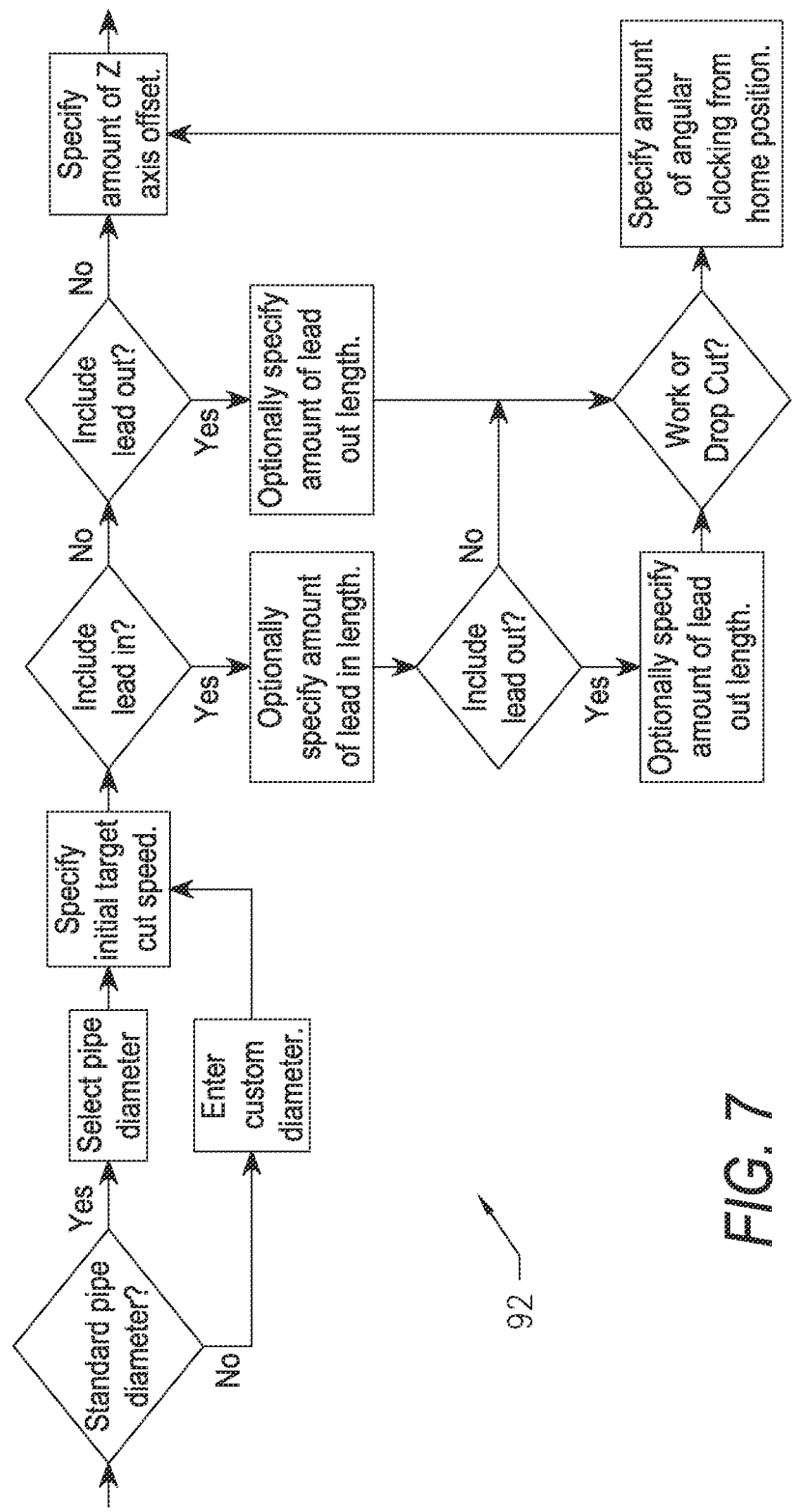
FIGS. 7 through 11B illustrate schematic flow charts of alternate processes to implement a selected cut in accordance with the process of the present invention.

If a straight cut is desired as seen at box 92, the procedure is shown on the flow chart in FIG. 7.

Figure 10:
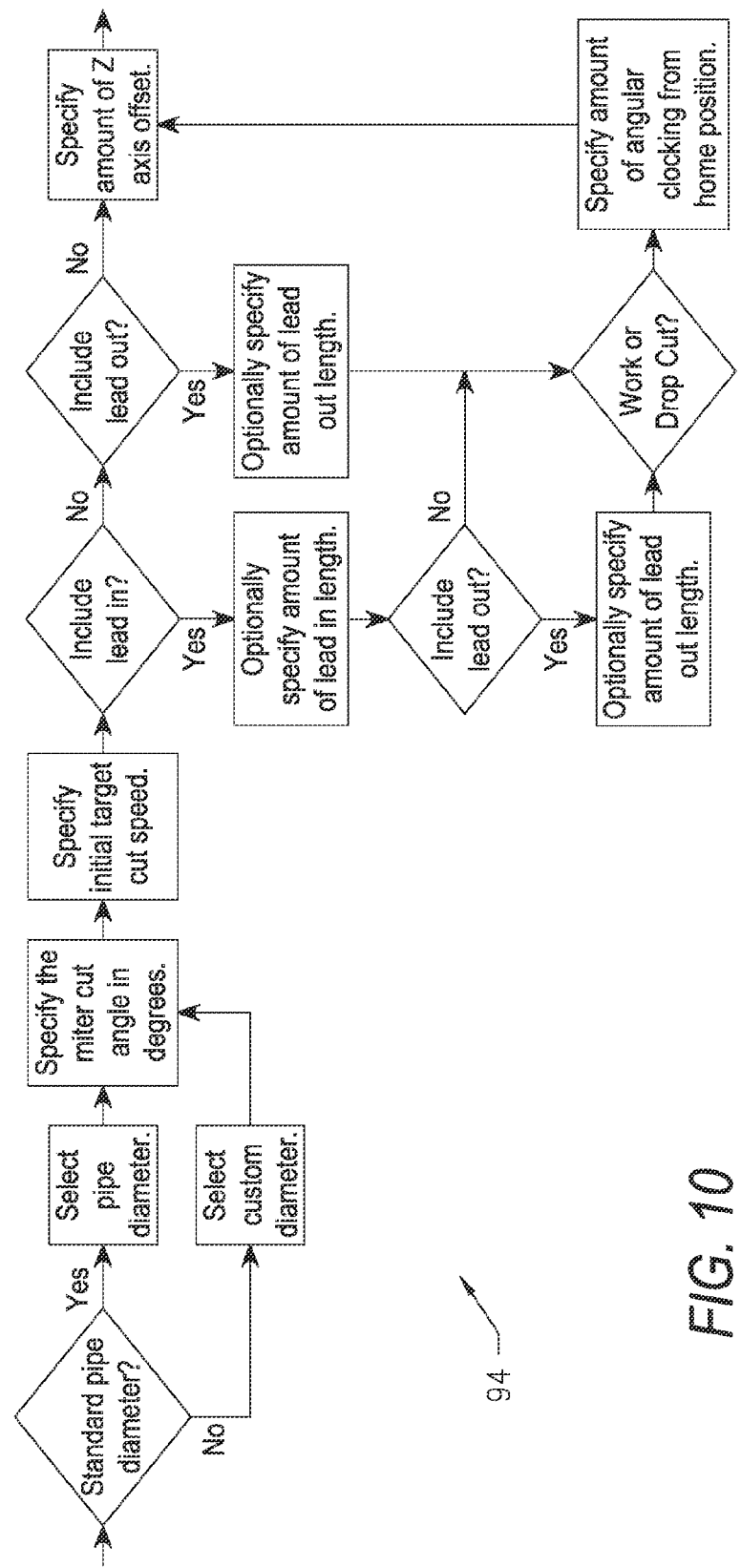

If a miter cut is desire as seen at box 94, the flow chart is shown on FIG. 10.

Figure 11A:
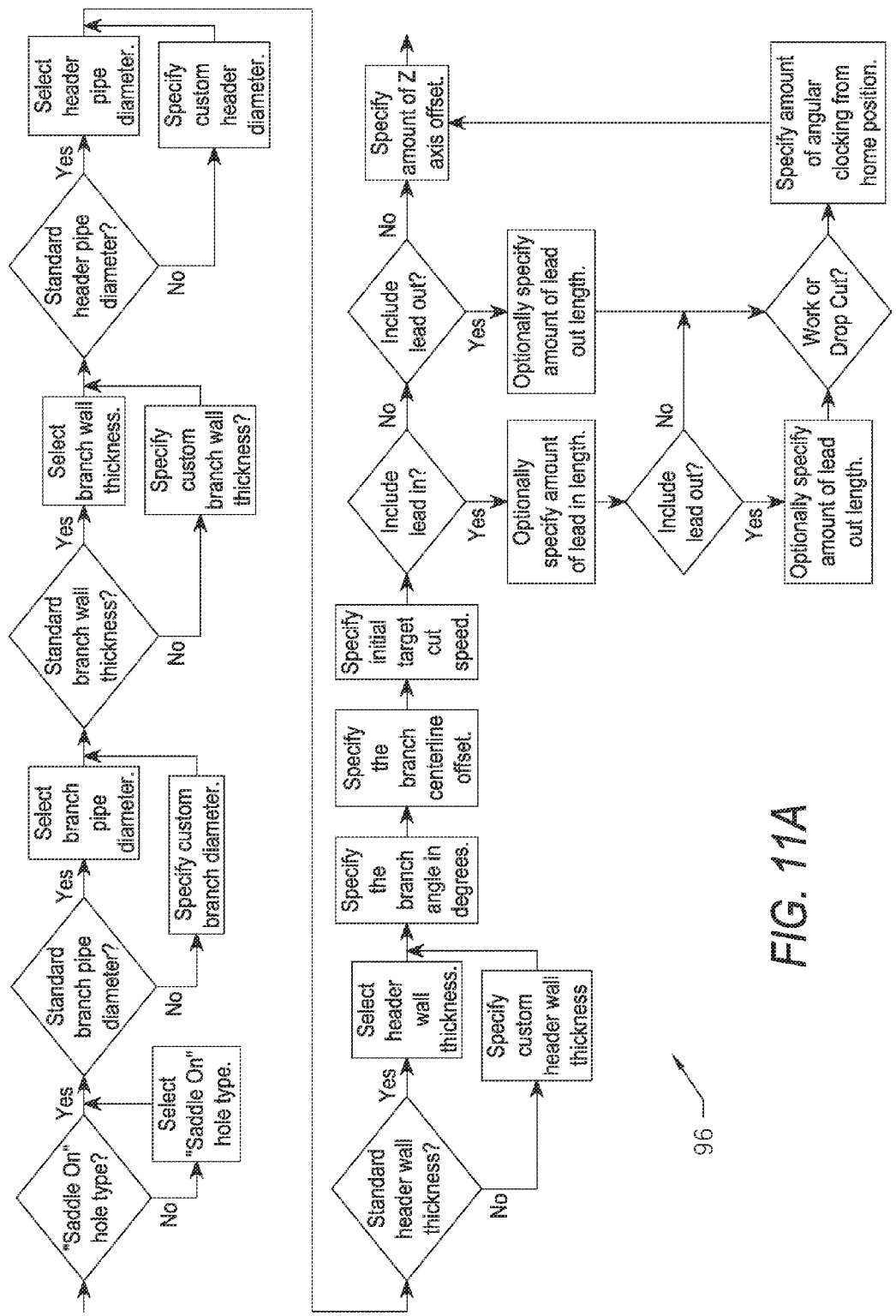
Figure 11B:
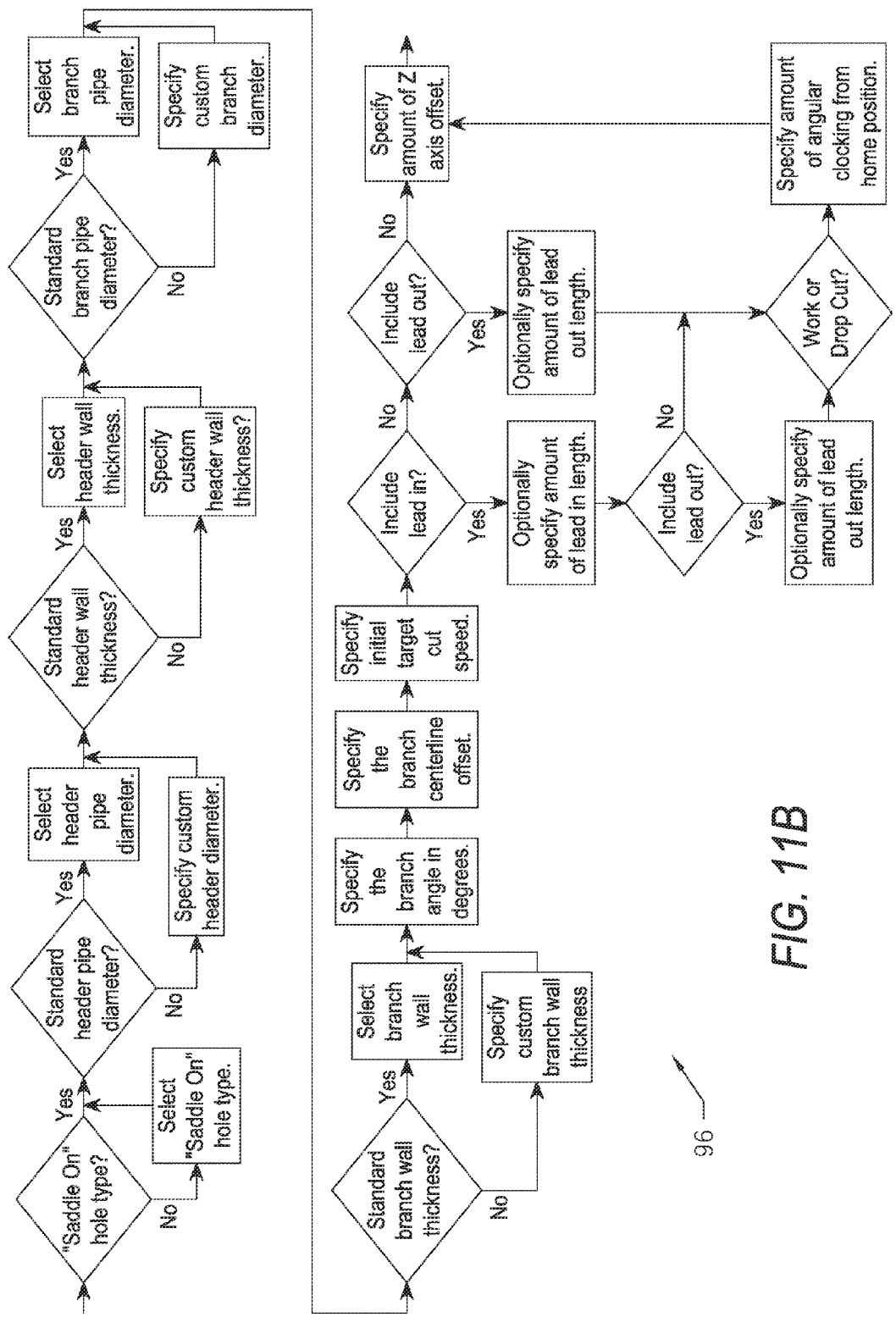

If a saddle hole cut as seen at box 96 is desired, the flow chart is shown on FIGS. 11A and 11B.

Figure 8:
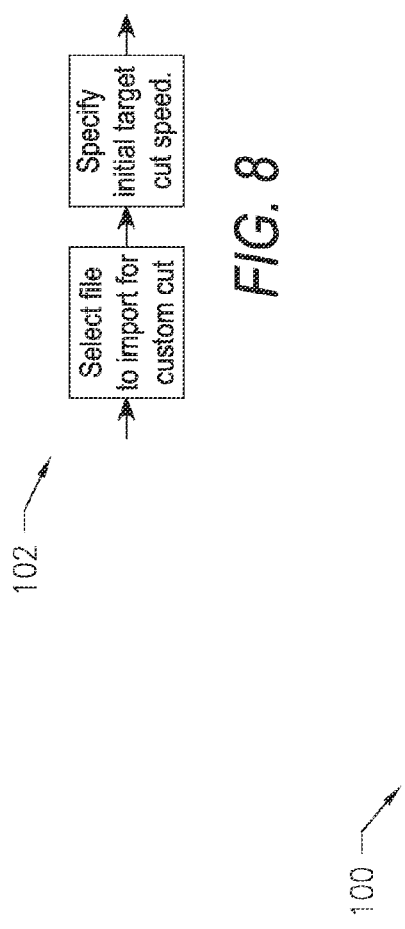
Figure 9:
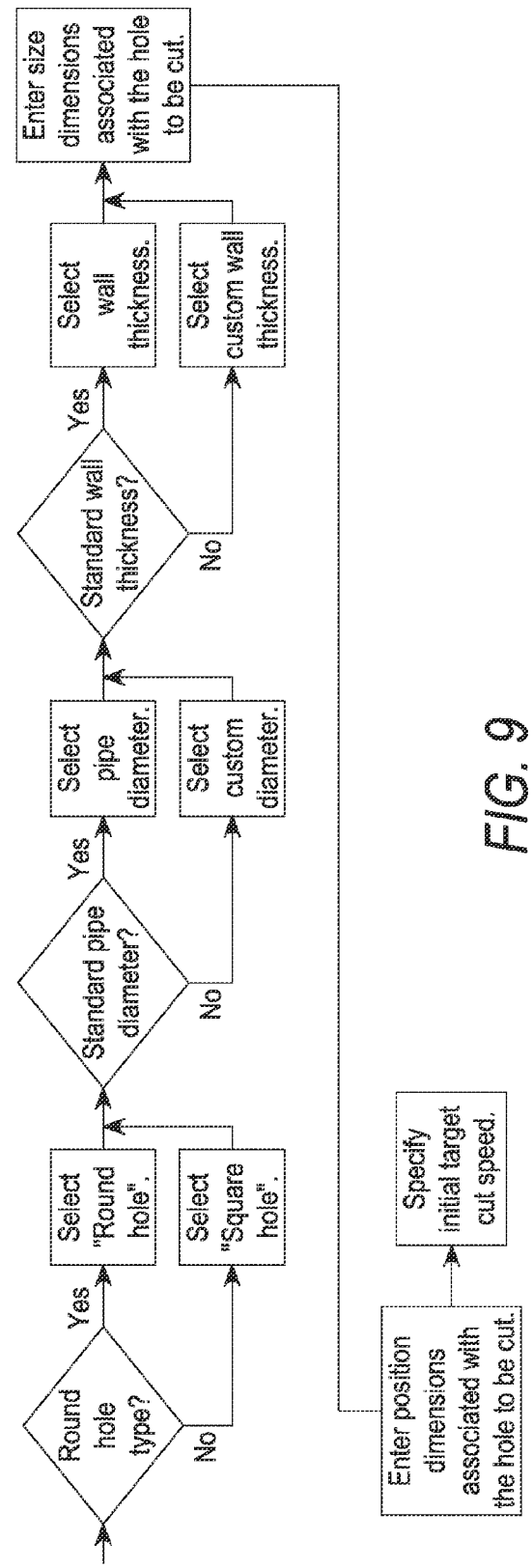

If a square/round cut is desired as seen at box 100, the process is shown in FIG. 9. Finally if a custom pipe cut is desired as seen at box 102, the flow chart is shown in FIG. 8.

Thereafter, as shown at box 104, the cut configuration will be verified in a summary screen presented to the user. Unless desired adjustments are made, the pipe cutting procedure will be started, as shown at box 106. The procedure may be paused, as shown at box 108 or stopped as shown at diamond 110, as desired.

The speed of the cut may be increased or decreased as desired. The pipe cut will proceed until completed, at which time the user will click "okay" on a screen presented, as shown at box 120. The completed, cut configuration procedure may be exported to a computer file that can be saved on a local or network computer as shown at box 22.

Thereafter if the pipe cutting is completed, power to the machine may be turned off and the reverse procedure performed to remove the system from the pipe.

Whereas, the present invention has been described in relation to the drawings attached hereto, it should be understood that other and further modifications, apart from those shown or suggested herein, may be made within the spirit and scope of this invention.

What is claimed is:

1. A field portable pipe-mounted pipe cutting system with integral controls, which system comprises:
   a torch carriage assembly having a torch for cutting a cylindrical pipe;
   a saddle and cap ring assembly secured to said pipe;
   a ring gear engaging said saddle and cap ring;
   at least one drive gear engaging said ring gear;
   a drive gear step drive motor having a shaft rotating said drive gear;
   a motion control module to control movement of said drive gear step drive motor and said at least one drive gear;
   a lead screw assembly moving said torch carriage assembly longitudinally parallel to an axis of said pipe;
   a lead screw step drive motor driving said lead screw assembly; and
   a motion control module to control movement of said lead screw step drive motor and said lead screw assembly.

2. The pipe cutting system as set forth in claim 1 including interface software to interface with a central processing unit having software to control said motion control module.

3. The pipe cutting system as set forth in claim 1 wherein said motion control module, step drivers and a power supply are contained in a housing attached to said saddle and cap ring.

4. The pipe cutting system as set forth in claim 1 wherein said torch carriage assembly includes a torch holder retaining said torch and wherein said torch holder is adjustable for selected orientation.

5. The pipe cutting system as set forth in claim 1 including computer program software and a database to select from a plurality of cuts configuration options and to implement a selected cut by interface with said drive gear step drive motor motion control module and said lead screw step drive motion control module.

6. The pipe cutting system as set forth in claim 1 wherein said at least one drive gear includes a pair of drive gears connected by a chain.

7. A pipe cutting process for a field portable pipe-mounted pipe cutting system, which process comprises:

mounting a field portable pipe cutting system with integral controls on a cylindrical pipe;

connecting said pipe cutting system to a computer software program to select and control at least one step motion control module, which controls a drive gear step drive motor;

connecting said pipe cutting system to a computer software program to select and control at least one lead screw motion control module to control movement of a lead screw step drive motor;

selecting whether to create a new pipe cut or a previous cut;

if a new cut, selecting from a plurality of different cut configuration options; and implementing the selected cut in accordance with a selected cut configuration option chosen from the plurality of different cut configuration options.

8. A process as set forth in claim 7 wherein the plurality of different cut configuration options includes:

a straight cut, a miter cut, a saddle hole cut, a saddle cut, a square/round cut, and a library of custom cuts configurations created individually as requested.

\* \* \* \* \*